(12) United States Patent
Choi et al.

(10) Patent No.: US 9,483,964 B2
(45) Date of Patent: Nov. 1, 2016

(54) DISPLAY APPARATUS

(71) Applicant: Samsung Display Co., Ltd., Yongin, Gyeonggi-Do (KR)

(72) Inventors: Seongsik Choi, Seoul (KR); Jong-Myeong Park, Asan-si (KR); Kyu-Hun Shim, Seoul (KR); Yong-Hwi Kim, Asan-si (KR); Jaesang Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 103 days.

(21) Appl. No.: 14/600,143

(22) Filed: Jan. 20, 2015

(65) Prior Publication Data

US 2015/0285467 A1    Oct. 8, 2015

(30) Foreign Application Priority Data

Apr. 7, 2014    (KR) .......................... 10-2014-0041303

(51) Int. Cl.
*G02F 1/1333* (2006.01)
*G09F 9/30* (2006.01)
*G02F 1/1335* (2006.01)

(52) U.S. Cl.
CPC ......... *G09F 9/301* (2013.01); *G02F 1/133608* (2013.01); *G09F 9/30* (2013.01); *G02F 1/133308* (2013.01); *G02F 1/133606* (2013.01); *G02F 2001/133314* (2013.01)

(58) Field of Classification Search
CPC ..................... G09F 9/301; G09F 9/30; G02F 2001/133314; G02F 2001/133317; G02F 2001/1332; G02F 2001/133607; G02F 1/133308; G02F 1/133602; G02F 1/133604; G02F 1/133605; G02F 1/133606; G02F 1/133608
See application file for complete search history.

(56) References Cited

U.S. PATENT DOCUMENTS

| | | | |
|---|---|---|---|
| 6,078,138 A | 6/2000 | Iketsu |
| 6,332,690 B1 | 12/2001 | Murofushi |
| 6,654,071 B2 | 11/2003 | Chen |
| 7,190,503 B2 | 3/2007 | Ide |
| 7,551,432 B1 | 6/2009 | Bockheim et al. |
| 7,586,580 B2 | 9/2009 | Matsuda et al. |
| 7,602,553 B2 | 10/2009 | Matsushita et al. |
| 7,609,355 B2 | 10/2009 | Nouchi et al. |
| 7,667,783 B2 | 2/2010 | Hong et al. |

(Continued)

FOREIGN PATENT DOCUMENTS

| | | |
|---|---|---|
| JP | 2010210891 A | 9/2010 |
| JP | 2012022779 A | 2/2012 |

(Continued)

*Primary Examiner* — Alan Cariaso
(74) *Attorney, Agent, or Firm* — Cantor Colburn LLP

(57) ABSTRACT

A display apparatus includes a display panel which receives a light to display an image, a backlight unit which provides the light to the display panel, and a first protection member accommodating the backlight unit therein. The first protection member includes a bottom part, an inclined part connected to an edge of the bottom part and bent upward at a predetermined angle with respect to the bottom part, a connection part connected to an edge of the inclined part, and a first sidewall part connected to an edge of the connection part and extending upward. The display panel, the backlight unit, the bottom part and the connection part have a curved surface shape in a first direction and have a flat shape in a second direction substantially perpendicular to the first direction.

17 Claims, 5 Drawing Sheets

(56) References Cited

U.S. PATENT DOCUMENTS

| | | |
|---|---|---|
| 7,667,786 B2 | 2/2010 | Nouchi et al. |
| 7,667,891 B2 | 2/2010 | Cok et al. |
| 7,791,279 B2 | 9/2010 | Kwon et al. |
| 7,834,962 B2 | 11/2010 | Satake et al. |
| 7,847,912 B2 | 12/2010 | Nishizawa et al. |
| 7,920,223 B2 | 4/2011 | Nishizawa et al. |
| 8,111,347 B2 | 2/2012 | Koganezawa |
| 8,212,962 B2 | 7/2012 | Rocard et al. |
| 8,253,882 B2 * | 8/2012 | Kikuchi ............... G09F 9/301 349/58 |
| 8,531,621 B2 | 9/2013 | Hamada |
| 8,994,894 B2 * | 3/2015 | Yamazaki ......... G02F 1/133605 349/113 |
| 9,274,362 B2 * | 3/2016 | Hsiao ............... G02F 1/133308 |
| 9,366,804 B2 * | 6/2016 | Hsiao ............... G02F 1/133308 |
| 2002/0001187 A1 | 1/2002 | Murofushi |
| 2004/0120048 A1 | 6/2004 | Laverty |
| 2005/0170736 A1 | 8/2005 | Cok |
| 2006/0050169 A1 | 3/2006 | Misawa |
| 2006/0098153 A1 | 5/2006 | Slikkerveer et al. |
| 2006/0273304 A1 | 12/2006 | Cok |
| 2007/0139605 A1 | 6/2007 | Matsuda et al. |
| 2007/0146569 A1 | 6/2007 | Nouchi et al. |
| 2007/0146616 A1 | 6/2007 | Nouchi et al. |
| 2008/0049003 A1 | 2/2008 | Hasegawa |
| 2008/0137013 A1 | 6/2008 | Kamoshida |
| 2008/0303976 A1 | 12/2008 | Nishizawa et al. |
| 2009/0015747 A1 | 1/2009 | Nishizawa et al. |
| 2009/0091681 A1 | 4/2009 | Nishizawa et al. |
| 2009/0096965 A1 | 4/2009 | Nagata |
| 2009/0122223 A1 | 5/2009 | Hayano et al. |
| 2009/0161048 A1 | 6/2009 | Satake et al. |
| 2009/0284904 A1 | 11/2009 | Wu et al. |
| 2009/0316062 A1 | 12/2009 | Nishizawa |
| 2010/0073593 A1 | 3/2010 | Sasaki et al. |
| 2010/0115812 A1 | 5/2010 | Sun |
| 2010/0195040 A1 | 8/2010 | Koganezawa |
| 2010/0289983 A1 | 11/2010 | Rocard et al. |
| 2011/0019129 A1 | 1/2011 | Nishizawa et al. |
| 2011/0090713 A1 | 4/2011 | Chen et al. |
| 2011/0096262 A1 | 4/2011 | Kikuchi |
| 2011/0255039 A1 | 10/2011 | Enomoto |
| 2012/0020056 A1 | 1/2012 | Yamagata et al. |
| 2012/0044618 A1 | 2/2012 | Lee |
| 2013/0128128 A1 | 5/2013 | Ikuta |
| 2013/0148035 A1 | 6/2013 | Shimizu |
| 2015/0153607 A1 * | 6/2015 | Chen ............... G02F 1/133308 349/65 |
| 2015/0160407 A1 * | 6/2015 | Hsiao ............... G02F 1/133308 349/65 |

FOREIGN PATENT DOCUMENTS

| | | |
|---|---|---|
| JP | 5157979 B2 | 12/2012 |
| KR | 1020070029980 A | 3/2007 |
| KR | 1020070096186 A | 10/2007 |
| KR | 1020110025493 A | 3/2011 |
| KR | 10-1319543 B1 | 10/2013 |
| KR | 1020140007202 A | 1/2014 |
| KR | 1020140051689 A | 5/2014 |
| KR | 1020140052239 A | 5/2014 |
| KR | 1020140120162 A | 10/2014 |
| KR | 1020140123178 A | 10/2014 |

* cited by examiner

DISPLAY APPARATUS

This application claims priority to Korean Patent Application No. 10-2014-0041303, filed on Apr. 7, 2014, and all the benefits accruing therefrom under 35 U.S.C. §119, the contents of which are hereby incorporated by reference.

BACKGROUND

1. Field

The invention relates to a display apparatus. More particularly, the invention relates to a display apparatus capable of improving brightness uniformity at edges thereof and reducing a non-display area thereof.

2. Description of the Related Art

In general, a display apparatus includes a display panel displaying images thereon and a backlight unit providing light to the display panel.

The display panel includes a first substrate on which pixels are disposed, a second substrate facing the first substrate, and an image display layer interposed between the first substrate and the second substrate. The image display layer is driven by the pixels, and light transmittance of the light passing through the image display layer is controlled by the image display layer, to thereby display the images. The image display layer is a liquid crystal layer, an electrowetting layer or an electrophoretic layer.

The display apparatus has been designed to have a flat shape, but a display apparatus having a curved surface shape has been developed.

SUMMARY

One or more exemplary embodiment of the invention provides a display apparatus capable of improving brightness uniformity at edges thereof.

One or more exemplary embodiment of the invention provides a display apparatus capable of reducing a non-display area thereof.

Exemplary embodiments of the invention provide a display apparatus including a display panel which receives a light to display an image, a backlight unit which provides the light to the display panel, and a first protection member accommodating the backlight unit therein. The first protection member includes a bottom part, an inclined part having an inclined surface connected to an edge of the bottom part and bent upward at a predetermined angle with respect to the bottom part, a connection part connected to an edge of the inclined part, and a first sidewall part connected to an edge of the connection part and extending in an upward direction. The display panel, the backlight unit, the bottom part and the connection part have a curved surface shape in a first direction and have a flat shape in a second direction substantially perpendicular to the first direction.

In the first direction, the connection part may extend outward from the inclined part and substantially parallel to a curved surface shape extension line extending outward from the edge of the bottom part, and in the second direction, the connection part may extend substantially parallel to the bottom part.

The predetermined angle at which the inclined surface of the inclined part is bent upward, may be about 9.1 degrees to about 9.3 degrees with respect to a line tangent to an outer edge lower surface of the bottom part.

The backlight unit may include a plurality of light sources which extends in the second direction, is arranged in the first direction at regular intervals and generates the light, a diffusion plate which has rigidity, is on the light sources and diffuses the light provided from the light sources, an optical sheet which is on the diffusion plate, condenses the diffused light and provides the condensed light to the display panel, and a reflection sheet which reflects the light traveling thereto from the light sources.

The bottom part may include a plurality of protrusion portions protruded downward from a lower surface of the bottom part and defining a plurality of grooves recessed downward from an upper surface of the bottom part. Each of the grooves and the protrusion portions may extend in the second direction and be arranged in the first direction at regular intervals. The plurality of light sources may respectively be inserted into a corresponding groove of the plurality of grooves.

Each of the light sources may include a plurality of light source units which is arranged in the first direction at regular intervals and generates the light, and a light source substrate on which the light source units are mounted. The light source substrate may be inserted into the corresponding groove of the grooves. A thickness of the light source substrate may be equal to a depth of the corresponding groove.

The reflection sheet may contact upper surfaces of the bottom part, the inclined part and the connection part except for areas at which the grooves are disposed, and the diffusion plate may be on the reflection sheet.

A plurality of holes may be defined in the reflection sheet, respectively corresponding to the light source units and in which the light source units are inserted.

The diffusion plate may have the curved surface shape in the first direction and the flat shape in the second direction, and the diffusion plate may contact a portion of the reflection sheet overlapping the connection part of the first protection member.

A side surface of each of the reflection sheet, the diffusion plate and the optical sheet may be adjacent to an inner surface of the first sidewall part.

The display apparatus may further include a second protection member between the display panel and the backlight unit and in which a first opening portion is defined, and a third protection member on the display panel and in which a second opening portion is defined. The second opening portion may be overlapped with the first opening portion and may be smaller than the first opening portion. The first and second protection members may have the curved surface shape in the first direction and may have the flat shape in the second direction.

The display panel may include a display area, and a non-display area surrounding the display area. The second protection member may cover the first sidewall part and a predetermined area of an edge of the backlight unit and support the non-display area of the display panel. The third protection member may cover the second protection member and the non-display area of the display panel. The display area of the display panel may be exposed through the second opening portion.

The second protection member may further include a second sidewall part adjacent to an outer surface of the first sidewall part.

The third protection member may further include a third sidewall part adjacent to an outer surface of the second sidewall part.

The first direction may be substantially parallel to a line tangent to a center lower surface of the bottom part. The first, second and third sidewall parts may extend in a third direction substantially perpendicular to the first and second directions.

According to one or more exemplary embodiment described above, the brightness uniformity of the edge of the display apparatus may be improved and the bezel area of the display apparatus may be reduced.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
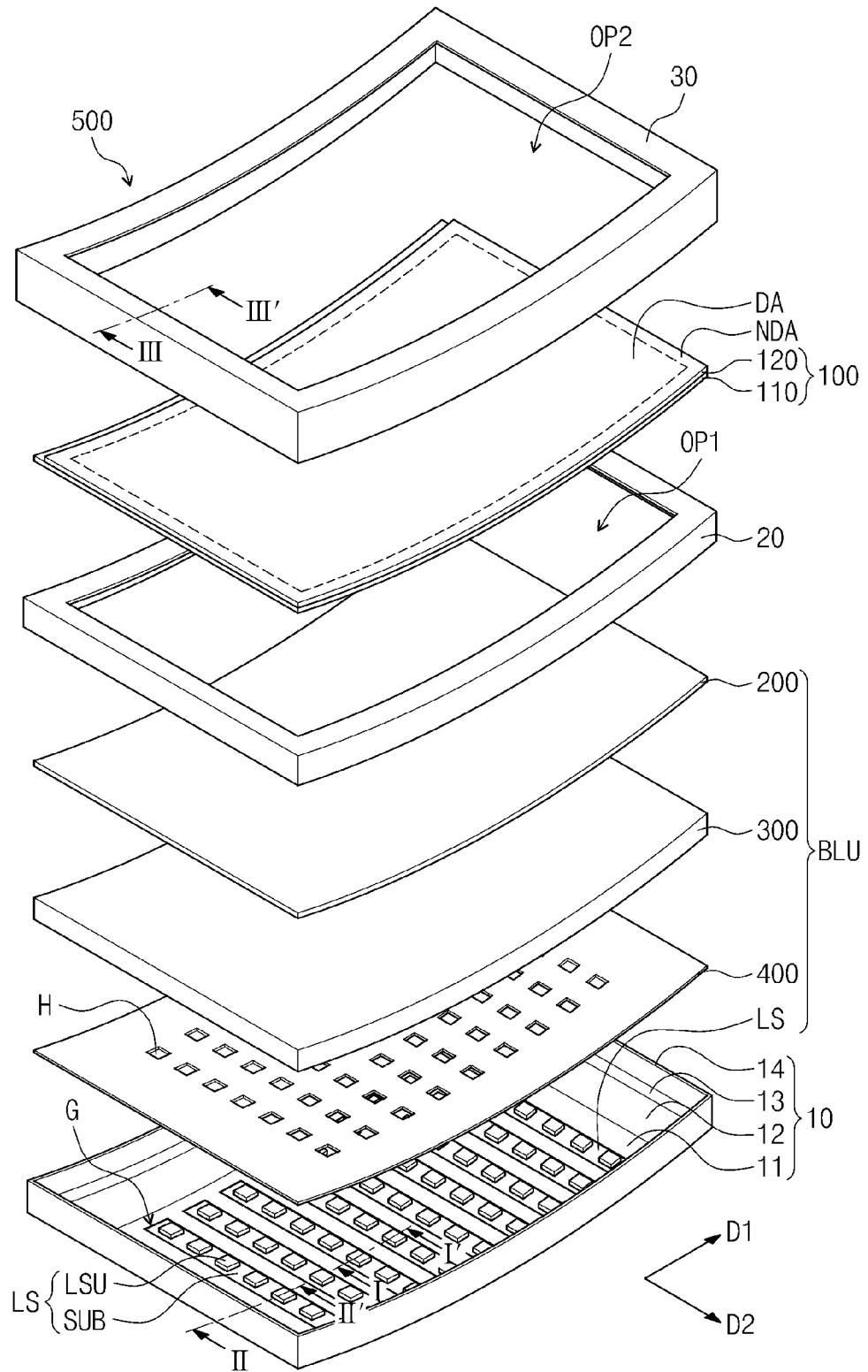
FIG. 1 is an exploded perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing an exemplary embodiment of a display apparatus 500 according to the invention.

Referring to FIG. 1, the display apparatus 500 has long sides extended in a first direction D1, and short sides extended in a second direction D2 substantially perpendicular to the first direction D1.

The display apparatus 500 has a curved surface shape with a predetermined curvature in the first direction D1 and has a flat shape in the second direction D2. That is, the display apparatus 500 is a curved display apparatus having the curved surface shape curved in the first direction D1.

In detail, the display apparatus 500 includes a display panel 100, a backlight unit BLU, and protection members 10, 20 and 30. The display panel 100, the backlight unit BLU, and the protection members 10, 20 and 30 each have long sides extended in the first direction D1 and have short sides extended in the second direction D2.

The display panel 100, the backlight unit BLU, and the protection members 10, 20 and 30 have a curved surface shape with a predetermined curvature in the first direction D1 and have a flat shape in the second direction D2.

The display panel 100 may be a liquid crystal display panel, an electrophoretic display panel or an electrowetting display panel, but the invention is not limited thereto or thereby.

In the illustrated exemplary embodiment, the liquid crystal display panel, which includes a first substrate 110, a second substrate 120 facing the first substrate 110, and a liquid crystal layer (not shown) interposed between the first substrate 110 and the second substrate 120, will be described as the display panel 100.

The backlight unit BLU is disposed at a rear of the display panel 100 and is configured to generate and provide a light to the display panel 100. The display panel 100 displays an image using the light provided from the backlight unit BLU. The protection members 10, 20 and 30 accommodate the backlight unit BLU and the display panel 100 therein and are configured to protect the backlight unit BLU and the display panel 100.

The backlight unit BLU includes an optical sheet 200, a diffusion plate 300, a reflection sheet 400 and a plurality of light sources LS. The optical sheet 200, the diffusion plate 300 and the reflection sheet 400 have long sides extended in the first direction D1 and have short sides extended in the second direction D2. The diffusion plate 300, which has rigidity, has a curved surface shape with a predetermined curvature in the first direction D1 and has a flat shape in the second direction D2.

The optical sheet 200 is disposed at the rear of the display panel 100. Although not shown in FIG. 1, the optical sheet 200 may collectively include a diffusion sheet, a prism sheet disposed on the diffusion sheet and/or a protection sheet disposed on the prism sheet.

The diffusion sheet of the optical sheet 200 may diffuse the light provided from the diffusion plate 300. The prism sheet of the optical sheet 200 may condense the light diffused by the diffusion sheet to a direction that is substantially perpendicular to a flat surface of the display panel 100. Thus, after the light passes through the prism sheet, the light travels in a direction substantially vertical to the flat surface of the display panel 100. As a result, the light may be provided to the display panel 100 at uniform brightness distribution. The protection sheet of the optical sheet 200 may protect the prism sheet that is vulnerable to a scratch.

The diffusion plate 300 is disposed at a rear of the optical sheet 200. The diffusion plate 300 includes a diffusion agent dispersed therein and/or the diffusion plate 300 is coated with a diffusing layer thereon. The diffusion plate 300 is configured to diffuse the light provided from the light sources LS disposed at a rear of the diffusion plate 300 and provide the diffused light to the optical sheet 200.

The reflection sheet 400 is disposed at a rear of the diffusion plate 300. A plurality of holes H is defined in the reflection sheet 400. The light sources LS are disposed at a rear of the reflection sheet 400. The light sources LS extend in the second direction D2 and are arranged at regular intervals in the first direction D1.

Each of the light sources LS includes a plurality of light source units LSU configured to generate and to emit the light, and a light source substrate SUB on which the light source units LSU are mounted. The light source substrate SUB extends in the second direction D2. The light source units LSU mounted on a same light source substrate SUB are arranged in the second direction D2 such as at regular intervals.

Each of the light source units LSU may be a light emitting diode and have a rectangular shape, but the invention is not limited thereto or thereby. That is, each of the light source units LSU may have a circular shape. The light generated from the light source units LSU is provided to the diffusion plate 300.

Each of the light source units LSU is inserted into a corresponding hole among the holes H defined in the reflection sheet 400. The reflection sheet 400 reflects the light generated by the light source units LSU and traveling thereto and provides the reflected light to the diffusion plate 300.

The protection members 10, 20 and 30 include a first protection member 10, a second protection member 20 and a third protection member 30. The first, second and third protection members 10, 20 and 30 each have a curved surface shape with a predetermined curvature in the first direction D1 and have a flat shape in the second direction D2.

The first protection member 10 is disposed at a rear of the backlight unit BLU and accommodates the backlight unit BLU therein. The first protection member 10 includes a bottom part 11, an inclined part 12, a connection part 13 and a first sidewall part 14.

The bottom part 11 has long sides extended in the first direction D1 and short sides extended in the second direction D2. The bottom part 11 has a curved surface shape with a predetermined curvature in the first direction D1 and has a flat shape in the second direction D2.

A plurality of grooves G are defined in the bottom part 11 and extending in the second direction D2. The grooves G are arranged in the first direction D1 such as at regular intervals. The light sources LS are disposed in a corresponding groove G among the plurality of grooves G.

The inclined part 12 is connected to an edge of the bottom part 11. The inclined part 12 has an inclined surface bent upward from the bottom part 11 at a predetermined angle.

The connection part 13 is connected to an edge of the inclined part 12. The connection part 13 has a curved surface shape with a predetermined curvature in the first direction D1 and extends outward in the second direction D2 to have a flat shape.

The first sidewall part 14 is connected to an edge of the connection part 13. The first sidewall part 14 extends in an upward direction.

The second protection member 20 is disposed between the display panel 100 and the backlight unit BLU. The second protection member 20 has a rectangular frame shape. The second protection member 20 is disposed to correspond to a non-display area NDA of the display panel 100. The second protection member 20 is provided with a first opening OP1 extended through a thickness thereof.

The third protection member 30 is disposed on the display panel 100. The third protection member 30 is provided with a second opening OP2 extended through a thickness thereof and exposing a display area DA of the display panel 100. The second opening OP2 is disposed to overlap with the first opening OP1, and the second opening OP2 has a size smaller than that of the first opening OP1 in the plan view.

A structure of the display panel 100 and the backlight unit BLU, which are accommodated in the protection members 10, 20 and 30, and the first protection member 10 will be described in detail later.

Figure 2:
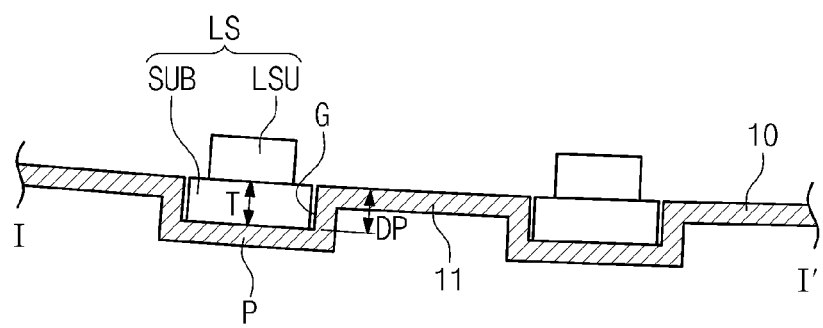
FIG. 2 is a cross-sectional view taken along line I-I' of FIG. 1.
Figure 3:
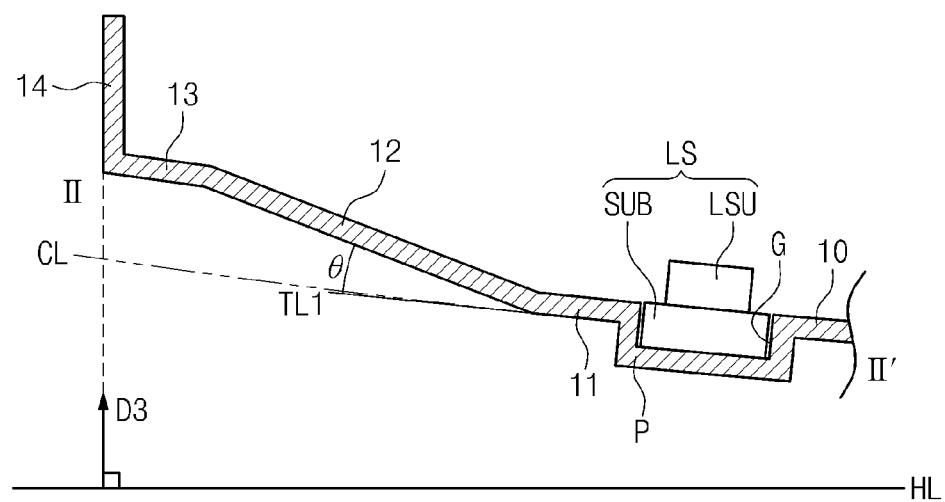
FIG. 3 is a cross-sectional view taken along line II-IP of FIG. 1.

FIG. 2 is a cross-sectional view taken along line I-I' of FIG. 1 and FIG. 3 is a cross-sectional view taken along line II-II' of FIG. 1.

Referring to FIG. 2, the bottom part 11 of the first protection member 10 includes the grooves G defined therein, which are recessed from an upper surface of the bottom part 11. A plurality of protrusion portions P, each of which is overlapped with and defines a corresponding groove of the grooves G, is protruded downward from a lower surface of a main body of the bottom part 11.

As described earlier, the grooves G extend in the second direction D2 and are arranged in the first direction D1 such as at regular intervals. Although not shown in figures, the protrusion portions P extend in the second direction D2 and are arranged in the first direction D1 at the regular intervals.

Each of a light source substrate SUB among the light source substrates SUB is inserted into the corresponding groove G among the plurality of grooves G and the light source units LSU are mounted on the light source substrate SUB. The light source substrates SUB have a thickness T which is substantially the same as a depth DP of the grooves G. Thus, an upper surface of the light source substrate SUB is disposed at the same height as the upper surface of the bottom part 11, that is, coplanar with the upper surface of the bottom part 11.

Referring to FIG. 3, the inclined part 12 of the first protection member 10 has the inclined surface, which is bent upward from the bottom part 11 at a predetermined angle θ with respect to a first tangent line TL1 of a lower surface of the main body of the bottom part 11.

The connection part 13 extends outward parallel with a curved extension line CL of the bottom part 11, in the first direction D1. The curved extension line CL is defined as an extension line virtually extending outward from the edge of the bottom part 11 in the first direction D1 according to the curvature of the bottom part 11. Although not shown in figures, the connection part 13 extends in the second direction D2 substantially parallel with the bottom part 11.

The first sidewall part 14 extends in a third direction D3 that is substantially perpendicular to a horizontal line HL. The horizontal line HL is substantially parallel to a tangent line of a lower surface at a center of the bottom part 11. The horizontal line HL may be substantially parallel to the first direction D1. The third direction D3 is substantially perpendicular to the first direction D1 and the second direction D2.

Figure 4:
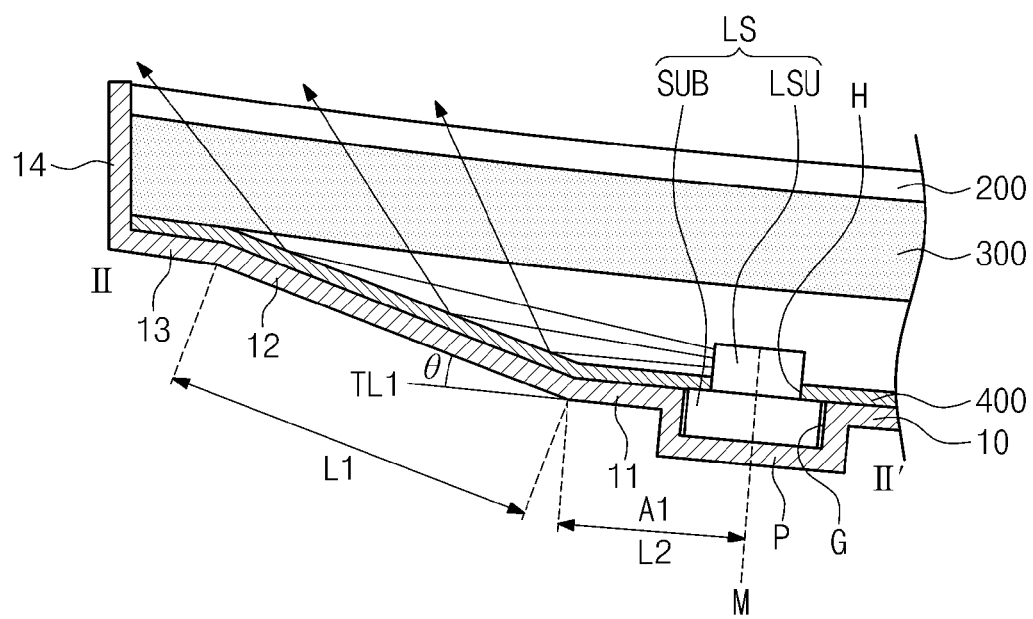
FIG. 4 is a cross-sectional view showing a light path reflected by a reflection sheet disposed on an inclined part in an exemplary embodiment of a display apparatus according to the invention.

FIG. 4 is a cross-sectional view showing a light path reflected by the reflection sheet disposed on the inclined part in an exemplary embodiment of a display apparatus according to the invention. For the convenience of explanation, FIG. 4 shows a cross-sectional view corresponding to the line II-II' of FIG. 1.

Referring to FIG. 4, the reflection sheet 400 is disposed to make contact with the upper surface of the bottom part 11, the inclined part 12 and the connection part 13 of the first protection member 10. In detail, the reflection sheet 400 is disposed to make contact with the upper surface of the bottom part 11, the inclined part 12 and the connection part 13 except for areas where the grooves G are disposed.

Each of the light source units LSU is inserted into a corresponding hole H among the plurality of holes H defined in the reflection sheet 400. The reflection sheet 400 has a thickness smaller than that of the light source units LSU.

The diffusion plate 300 is disposed on the reflection sheet 400. The diffusion plate 300 has rigidity. Thus, the diffusion plate 300 makes contact with a portion of the reflection sheet 400, which is disposed on the connection part 13. As a result, a predetermined space is formed between the diffusion plate 300 and the bottom part 11 and between the diffusion plate 300 and the inclined part 12.

The optical sheet 200 is disposed on the diffusion plate 300. Different from the diffusion plate 300 having the rigidity, the optical sheet 200 has a relatively thin thickness and is bent. Thus, the optical sheet 200 disposed on the diffusion plate 300 has the curved surface shape in the first direction D1 to correspond the shape of the diffusion plate 300 and has the flat shape in the second direction D2.

An outer side surface of the reflection sheet 400, the diffusion plate 300 and the optical sheet 200 is disposed adjacent to an inner surface of the first sidewall part 14.

A connection structure of the second protection member 20, the third protection member 30 and the display panel 100 will be described in detail with reference to FIG. 6.

Hereinafter, a length of the inclined part 12 will be referred to as a first length L1. A length between a center M of the light source unit LSU disposed adjacent to the side surface of the bottom part 11 and the side surface of the bottom part 11 will be referred to as a second length L2. An area between the center M of the light source unit LSU disposed adjacent to the side surface of the bottom part 11 and the side surface of the bottom part 11 will be referred to as a first area A1.

The light generated by the light source unit LSU is provided to the reflection sheet 400 disposed on the inclined part 12. The reflection sheet 400 reflects the light and provides the reflected light to the diffusion plate 300.

In a case that the angle θ between the inclined part 12 and the first tangent line TL1 is smaller than a predetermined angle, an amount of light, which is reflected by the reflection sheet 400 disposed on the inclined part 12 and provided to the diffusion plate 300, may be reduced. In this case, an area corresponding to the inclined part 12 may be perceived darker than the first area A1. That is, the area corresponding to the inclined part 12 may be observed as a dark region.

In a case that the angle θ between the inclined part 12 and the first tangent line TL1 is greater than the predetermined angle, the amount of light, which is reflected by the reflection sheet 400 disposed on the inclined part 12 and provided to the diffusion plate 300, may increase. Then, the area corresponding to the inclined part 12 may be perceived brighter than the first area A1. That is, the area corresponding to the inclined part 12 may be observed as a bright region.

Accordingly, the angle θ between the inclined part 12 and the first tangent line TL1 is set such that a difference in brightness between the first area A1 and the area corresponding to the inclined part 12 is not visible to a user.

In an exemplary embodiment, as an example, the angle θ between the inclined part 12 and the first tangent line TL1 may be set within a range from about 9.1 degrees to about 9.3 degrees. Where the angle θ between the inclined part 12 and the first tangent line TL1 may be set within a range from about 9.1 degrees to about 9.3 degrees, the difference in brightness between the first area A1 and the area corresponding to the inclined part 12 is not visible to the user.

Figure 5:
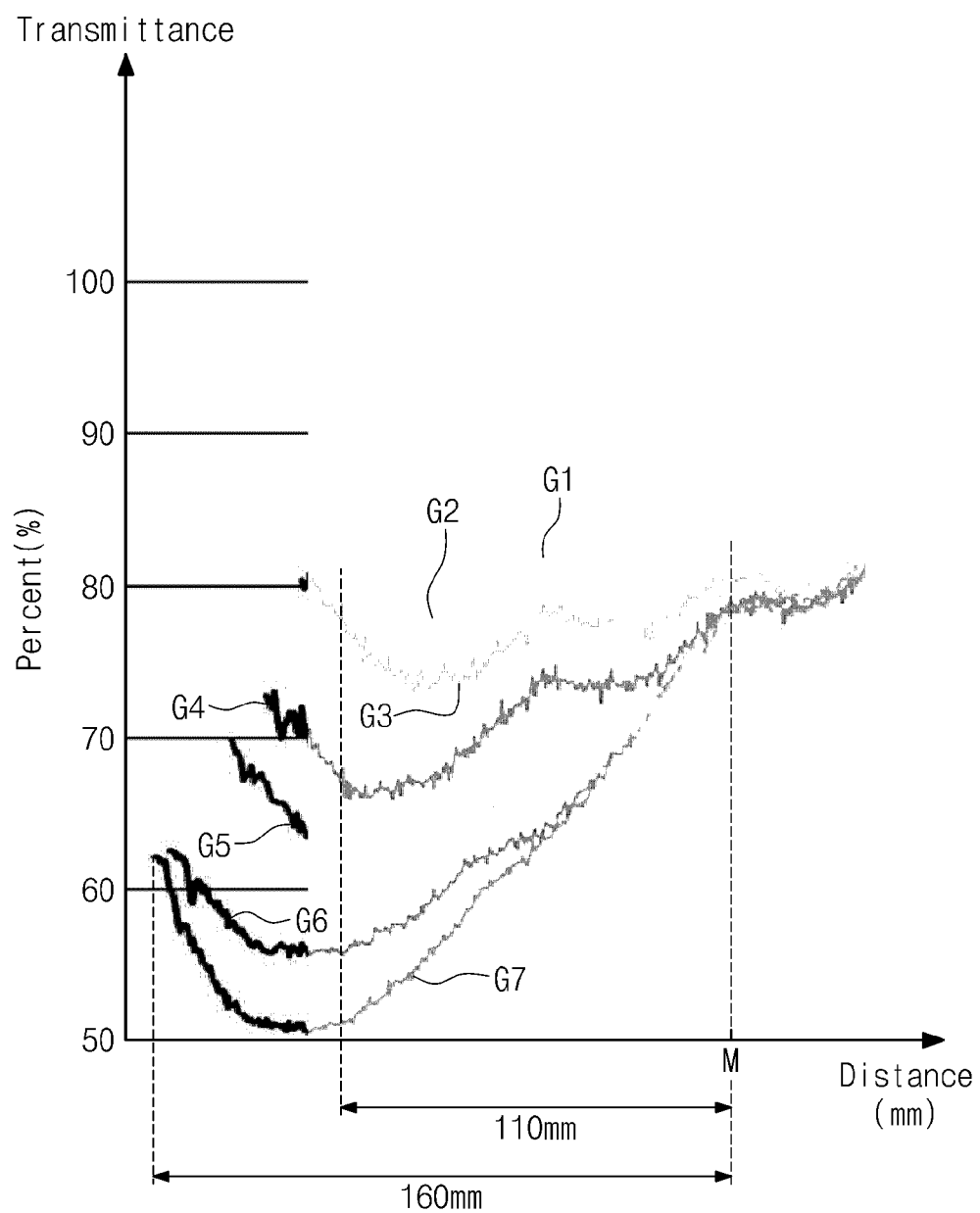
FIG. 5 is a graph showing light transmittance in percent (%) with respect to a distance in millimeters (mm) along a first protection member of a display apparatus, for exemplary embodiments of angles formed between an inclined part and a first tangent line.

FIG. 5 is a graph showing light transmittance in percent (%) with respect to a distance in millimeters (mm) along the first protection member 10, for exemplary embodiments of angles formed between the inclined part and the first tangent line.

For the convenience of explanation, FIG. 5 shows the light transmittance of an area between the center M of the light source unit LSU disposed adjacent to the side surface of the bottom part 11 and a position spaced apart from the center M by a predetermined distance. The first length L1 and the second length L2 are set to various values.

Table 1 shows the first length L1 and the second length L2 according to the angle θ between the inclined part 12 and the first tangent line TL1. The first length L1 and the second length L2 are shown in millimeters (mm)

TABLE 1

| | θ | L1 (mm) | L2 (mm) |
|---|---|---|---|
| G1 | 9.2 | 80 | 30 |
| G2 | 9.2 | 80 | 35 |
| G3 | 8.2 | 90 | 30 |
| G4 | 7.3 | 100 | 30 |
| G5 | 7.3 | 100 | 40 |
| G6 | 6.7 | 110 | 40 |
| G7 | 6.1 | 120 | 40 |

Referring to FIG. 5, a first graph G1 represents the light transmittance when the angle θ between the inclined part 12 and the first tangent line TL1 is set to about 9.2 degrees and the first and second lengths L1 and L2 are respectively set to about 80 millimeters and about 30 millimeters. Thus, the first graph G1 represents the light transmittance corresponding to the area between the center M of the light source unit LSU disposed adjacent to the side surface of the bottom part 11 and the position spaced apart from the center M in a left direction (refer to FIG. 4) by about 110 millimeters corresponding to a sum of the first length L1 and the second length L2.

Each of the other graphs G2 to G6 represents the light transmittance of the area between the center M of the light source unit LSU disposed adjacent to the side surface of the bottom part 11 and a position spaced apart from the center M in the left direction (refer to FIG. 4) by the distance corresponding to the sum of the first length L1 and the second length L2 detailed in Table 1. The light transmittance in the area disposed at the right side of the center M is not shown in detail for the convenience of explanation.

As shown in FIG. 5, in the first and second graphs G1 and G2, in which the angle θ between the inclined part 12 and the first tangent line TL1 is set to about 9.2 degrees, variations in the light transmittance of the inclined part 12 having the first length L1 and the first area A1 having the second length L2 are smaller than variations in the light transmittance represented by third to sixth graphs G3 to G6. In addition, when the angle θ between the inclined part 12 and the first tangent line TL1 is set to about 9.2 degrees, the difference in brightness between the inclined part 12 and the first area A1 is not visible to the user.

However, when the angle θ between the inclined part 12 and the first tangent line TL1 is set to about 8.2 degrees, about 7.3 degrees, about 6.7 degrees and about 6.1 degrees as represented by the third to seventh graphs G3 to G7, variations in the light transmittance between the inclined part 12 and the first area A1 are greater than variations in the light transmittance between the inclined part 12 and the first area A1 when the angle θ between the inclined part 12 and the first area A1 is set to about 9.2 degrees. Where the angle θ between the inclined part 12 and the first tangent line TL1 is set to about 8.2 degrees, about 7.3 degrees, about 6.7 degrees and about 6.1 degrees as represented by the third to seventh graphs G3 to G7, the inclined part 12 may be observed as the dark region by the user. Although not shown in FIG. 5, when the angle θ between the inclined part 12 and the first area A1 is greater than about 9.3 degrees, the inclined part 12 may be observed as the bright region to the user.

As an exemplary embodiment, when the angle θ between the inclined part 12 and the first tangent line TL1 is set within a range from about 9.1 degrees to about 9.3 degrees, the brightness difference between the inclined part 12 and the first area A1 is reduced, and thus the brightness difference between the inclined part 12 and the first area A1 may not be visible to the user. That is, the brightness uniformity in the inclined part 12 and the first area A1 may be improved.

The inclined part 12 and the first area A1 correspond to an edge portion of the display apparatus 500. Thus, the brightness uniformity at the edge portion of the display apparatus 500 may be improved.

Figure 6:
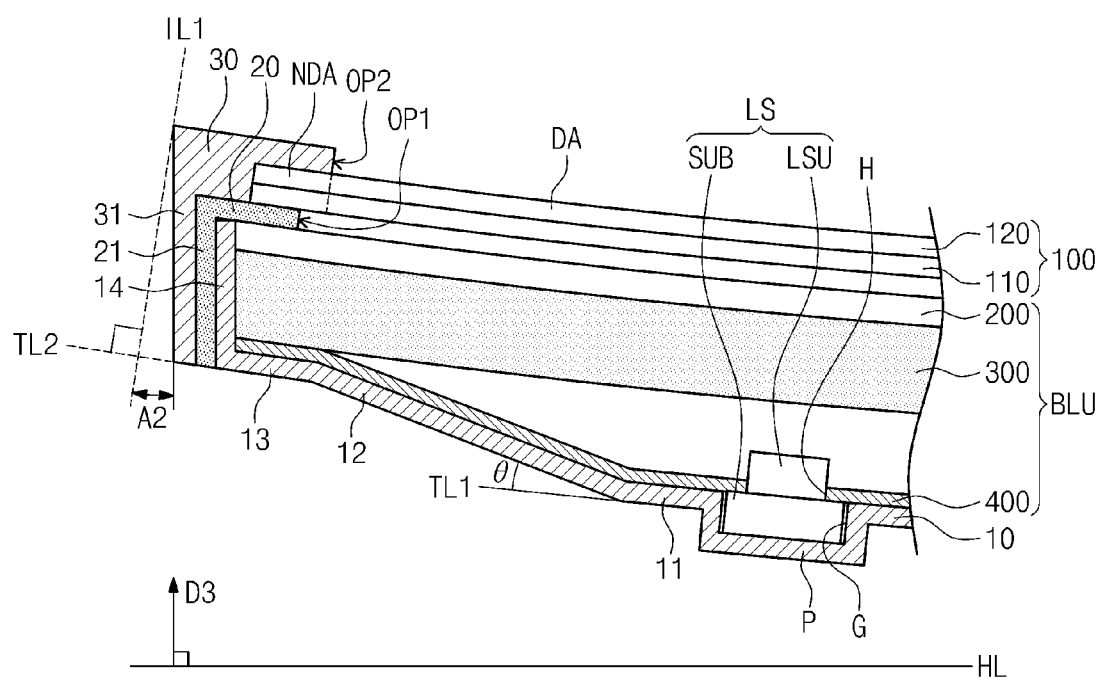
FIG. 6 is a cross-sectional view taken along line of III-III' of FIG. 1 to show an assembled state of the display apparatus.

FIG. 6 is a cross-sectional view taken along line of III-III' of FIG. 1 to show an assembled state of the display apparatus.

Since the collectively structure in which the light source LS, the reflection sheet 400, the diffusion plate 300 and the optical sheet 200 are accommodated in the first protection member 10 is substantially the same as described with reference to FIGS. 1 to 4, details thereof will be omitted in FIG. 6.

Referring to FIG. 6, the second protection member 20 is disposed to cover a predetermined area at the edge of the backlight unit BLU and the first sidewall part 14 of the first protection member 10. In detail, the second protection member 20 is disposed to cover the predetermined area at the edge of the optical sheet 200 accommodated in the first protection member 10 and the first sidewall part 14.

The second protection member 20 supports the non-display area NDA of the display panel 100. Particularly, a predetermined area of the non-display area NDA disposed adjacent to the edge of the display panel 100 is disposed on a predetermined area of the second protection member 20 adjacent to the first opening portion OP1.

The second protection member 20 includes a second sidewall part 21 extending parallel to the third direction D3 to be disposed adjacent to an outer surface of the first sidewall part 14.

The third protection member 30 is disposed to cover the non-display area NDA of the display panel 100 and a portion of the second protection member 20 on which the display panel 100 is not disposed. The display area DA of the display panel 100 is exposed through the second opening portion OP2 of the third protection member 30.

The third protection member 30 includes a third sidewall part 31 extending parallel to the third direction D3 to be disposed adjacent to an outer surface of the second sidewall part 21 of the second protection member 20.

Hereinafter, a line substantially perpendicular to a second tangent line TL2 of the lower surface of the connection part 13, which is disposed adjacent to the outer surface of the first sidewall part 14, will be referred to as a first imaginary line IL1.

The first, second and third sidewall parts 14, 21 and 31 may extend substantially parallel to the first imaginary line IL1 rather than parallel to the third direction D3. Where the first, second and third sidewall parts 14, 21 and 31 may extend substantially parallel to the first imaginary line ILL the first, second and third sidewall parts 14, 21, and 31 may extend such that the third sidewall part 31 extends to a second area A2. Thus, a bezel area in which no image is displayed may increase by the second area A2.

However, when the first, second and third sidewall parts 14, 21 and 31 extend substantially parallel to the third direction D3 as illustrated in FIG. 6, the bezel area may be reduced by the second area A2. Where the first, second and third sidewall parts 14, 21 and 31 extend substantially parallel to the third direction D3, the brightness uniformity at the edge of the display apparatus 500 may be improved and the bezel area of the display apparatus 500 may be reduced.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a display panel which receives a light and to display an image;
a backlight unit which provides the light to the display panel; and
a first protection member accommodating the backlight unit therein, the first protection member comprising:
a bottom part;
an inclined part having an inclined surface connected to an edge of the bottom part and bent upward at a predetermined angle with respect to the bottom part;
a connection part connected to an edge of the inclined part; and
a first sidewall part connected to an edge of the connection part and extending in an upward direction,
wherein the display panel, the backlight unit, the bottom part and the connection part have a curved surface shape in a first direction and have a flat shape in a second direction substantially perpendicular to the first direction.

2. The display apparatus of claim 1, wherein
in the first direction, the connection part extends outward from the inclined part and substantially parallel to a curved surface shape extension line extending outward from the edge of the bottom part, and
in the second direction, the connection part extends substantially parallel to the bottom part.

3. The display apparatus of claim 1, wherein the predetermined angle at which the inclined surface of the inclined part is bent upward, is about 9.1 degrees to about 9.3 degrees with respect to a line tangent to an outer edge lower surface of the bottom part.

4. The display apparatus of claim 1, wherein the backlight unit comprises:
a plurality of light sources which extends in the second direction, is arranged in the first direction at regular intervals, and generates the light;
a diffusion plate which has rigidity, is on the plurality of light sources and diffuses the light provided from the light sources;
an optical sheet which is on the diffusion plate, condenses the diffused light and provides the condensed light to the display panel; and
a reflection sheet which reflects the light traveling thereto from the light sources.

5. The display apparatus of claim 4, wherein
the bottom part comprises a plurality of protrusion portions protruded downward from a lower surface of the bottom part and defining a plurality of grooves recessed downward from an upper surface of the bottom part, each of the grooves and the protrusion portions extending in the second direction and arranged in the first direction at regular intervals, and
the plurality of light sources is respectively inserted into a corresponding groove of the plurality of grooves.

6. The display apparatus of claim 5, wherein
each of the plurality of light sources comprises:
a plurality of light source units which is arranged in the first direction at regular intervals and generates the light; and
a light source substrate on which the plurality of light source units is mounted, and
the light source substrate is inserted into the corresponding groove of the plurality of grooves.

7. The display apparatus of claim 6, wherein a thickness of the light source substrate is equal to a depth of the corresponding groove.

8. The display apparatus of claim 6, wherein
the reflection sheet contacts upper surfaces of the bottom part, the inclined part and the connection part, except for areas at which the grooves are disposed, and
the diffusion plate is on the reflection sheet.

9. The display apparatus of claim 8, wherein a plurality of holes is defined in the reflection sheet, respectively corresponding to the light source units and in which the light source units are inserted.

10. The display apparatus of claim 8, wherein the diffusion plate has the curved surface shape in the first direction and has the flat shape in the second direction, and the diffusion plate contacts a portion of the reflection sheet overlapping the connection part of the first protection member.

11. The display apparatus of claim 8, wherein a side surface of each of the reflection sheet, the diffusion plate and the optical sheet is adjacent to an inner surface of the first sidewall part of the first protection member.

12. The display apparatus of claim 1, further comprising:
a second protection member between the display panel and the backlight unit and in which a first opening portion is defined; and
a third protection member on the display panel and in which a second opening portion is defined,
wherein
the second opening portion is overlapped with the first opening portion and is smaller than the first opening portion, and
the first and second protection members have the curved surface shape in the first direction and have the flat shape in the second direction.

13. The display apparatus of claim 12, wherein
the display panel comprises a display area, and a non-display area surrounding the display area,
the second protection member covers the first sidewall part of the first protection member and a predetermined area of an edge of the backlight unit, and supports the non-display area of the display panel,
the third protection member covers the second protection member and the non-display area of the display panel, and
the display area of the display panel is exposed through the second opening portion of the third protection member.

14. The display apparatus of claim 13, wherein a predetermined area of the non-display area, adjacent to an edge of the display panel, overlaps a predetermined area of the second protection member, adjacent to the first opening portion.

15. The display apparatus of claim 13, wherein the second protection member further comprises a second sidewall part adjacent to an outer surface of the first sidewall part.

16. The display apparatus of claim 15, wherein the third protection member further comprises a third sidewall part adjacent to an outer surface of the second sidewall part.

17. The display apparatus of claim 16, wherein
the first direction is substantially parallel to a line tangent to a center lower surface of the bottom part, and the first, second and third sidewall parts extend in a third direction substantially perpendicular to the first and second directions.

\* \* \* \* \*